(12) United States Patent
Daly (10) Patent No.: US 7,469,741 B2
(45) Date of Patent: Dec. 30, 2008

(54) NON-METALLIC LASER WELDED INTERCOOLER SYSTEM

(75) Inventor: Paul Daly, Troy, MI (US)

(73) Assignee: Mahle International GmbH, Stuttgart (DE)

( * ) Notice: Subject to any disclaimer, the term of this patent is extended or adjusted under 35 U.S.C. 154(b) by 645 days.

(21) Appl. No.: 11/114,280

(22) Filed: Apr. 26, 2005

(65) Prior Publication Data

US 2005/0247442 A1 Nov. 10, 2005

Related U.S. Application Data

(60) Provisional application No. 60/565,372, filed on Apr. 26, 2004.

(51) Int. Cl.
*F28F 9/02* (2006.01)
*F28F 1/42* (2006.01)
*B23P 6/00* (2006.01)

(52) U.S. Cl. .................. 165/173; 165/175; 165/176; 165/179

(58) Field of Classification Search .......... 165/173, 165/175, 176, 149, 905; 29/890.03, 890.046; 522/2, 4; 264/1.37; 219/121.63, 121.64
See application file for complete search history.

(56) References Cited

U.S. PATENT DOCUMENTS

| 2,438,767 A | * | 3/1948 | Spieth .................. 165/67 |
| 3,363,680 A | * | 1/1968 | Baker .................. 165/158 |
| 3,489,209 A | * | 1/1970 | Johnson .................. 165/133 |
| 3,769,117 A | * | 10/1973 | Bowen et al. .......... 156/69 |
| 4,360,057 A | * | 11/1982 | Koump .................. 165/82 |
| 4,878,460 A | | 11/1989 | Uchida et al. |
| 4,911,135 A | | 3/1990 | Nishimura et al. |
| 5,469,915 A | * | 11/1995 | Cesaroni .................. 165/171 |
| 5,839,397 A | | 11/1998 | Funabashi et al. |
| 6,094,816 A | * | 8/2000 | Doshi .................. 29/890.043 |
| 6,098,576 A | | 8/2000 | Nowak, Jr. et al. |
| 6,220,207 B1 | | 4/2001 | Kawasaki et al. |
| 6,321,697 B1 | | 11/2001 | Matsuda et al. |
| 6,397,578 B2 | | 6/2002 | Tsukamoto et al. |
| 6,564,783 B2 | | 5/2003 | Chou et al. |
| 6,604,515 B2 | | 8/2003 | Marsh et al. |
| 6,634,420 B2 | | 10/2003 | Gokan et al. |
| 2003/0029040 A1 | * | 2/2003 | Cesaroni et al. ........ 29/890.046 |

* cited by examiner

*Primary Examiner*—Tho V Duong
(74) *Attorney, Agent, or Firm*—Carlson, Gaskey & Olds PC (57) ABSTRACT

A non-metallic intercooler assembly includes an intake header tank, outlet header tank, and a multitude of non-metallic charge tubes which communicate airflow from the intake header tank to the outlet header tank. Several combinations of plastics parts are described. Tanks of intercoolers can be made from plastics today but with complicated clamping and sealing. Each tank in this description can be laser welded in place. Various combinations of laser opaque and laser transparent materials are utilized to achieve an effective laser welding assembly process. Intake systems for automotive use are widely made of plastic materials today and this description shows how those types of materials can be employed in an intercooler. Each non-metallic tube can be supported by a plastic fin feature whose primary function is to support the structure to promote airflow conditions favorable to heat transfer.

12 Claims, 13 Drawing Sheets

NON-METALLIC LASER WELDED INTERCOOLER SYSTEM

BACKGROUND OF THE INVENTION

The present application claims priority to U.S. Provisional Patent Application Ser. No. 60/565,372, filed Apr. 26, 2004.

The present invention relates to an intercooler, and more particularly to a tube intensive intercooler assembly.

A multitude of systems for increasing the amount of air, and, concomitantly, fuel to an engine are well known. The concept of boosting charge, either with a turbocharger or supercharger, is well known. Moreover, the concept of using intercooling between a booster device, such as the turbocharger or supercharger, and the engine is also well known.

Intercooler or charge air cooler assemblies are relatively intricate systems which are typically manufactured from aluminum. Conventional intercooler assemblies utilize a multitude of flow passages which are cooled by air flowing over a multitude of fins which extend from external surfaces of the passages. Conventional intercoolers are "fin intensive" deigns in which a majority of the radiant cooling occurs through the metallic fins. Although effective, such conventional metallic intercooler assemblies are relatively heavy in weight and are also typically limited to rectilinear constructions.

Accordingly, it is desirable to provide a lightweight, thermally effective intercooler assembly which may be manufactured in a multitude of configurations.

SUMMARY OF THE INVENTION

A non-metallic intercooler assembly according to the present invention includes an intake header tank, an outlet header tank, and a multitude of non-metallic charge tubes which communicate airflow from the intake header tank to the outlet header tank. A multitude of non-metallic fins primarily provide structural support rather than thermal transfer as generally understood with a conventional aluminum radiator/intercooler system.

The intake header tank and the outlet header tank are manufactured from non-metallic or metallic materials. The multitude of non-metallic charge tubes and support side plates are manufactured of laser opaque material while the multitude of non-metallic fins are manufactured of laser transparent materials. The laser opaque and laser transparent materials are arranged and assembled to achieve an effective laser welding assembly process. The multitude of non-metallic charge tubes pass through the non-metallic fins and are laser welded thereto. As the multitude of non-metallic fins are laser transparent while the multitude of non-metallic charge tubes are laser opaque, the laser is readily directed to the desired location to assure a secure bond. Each of the non-metallic fins include an end section which is passed through a slot in the side plate and bent toward the side plate to provide a planar engagement surface to receive a laser weld. As the multitude of non-metallic fins are laser transparent while the side plates are laser opaque, the laser is readily directed from an external location to the planar engagement surface to assure a secure bond. The side plates are laser welded to an end cap which direct or collect the airflow to/from the multitude of non-metallic charge tubes and communicate airflow to/from the header tanks.

In another embodiment, the intercooler assembly is contoured to provide various shapes to facilitate installation in heretofore unavailable locations. In yet another embodiment, the multitude of non-metallic charge tubes are non-circular in cross-section to increase the packing density of the charge tubes and specifically tailor the size and shape of the intercooler assembly.

The present invention therefore provides a lightweight, thermally effective intercooler assembly which may be manufactured in a multitude of configurations.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
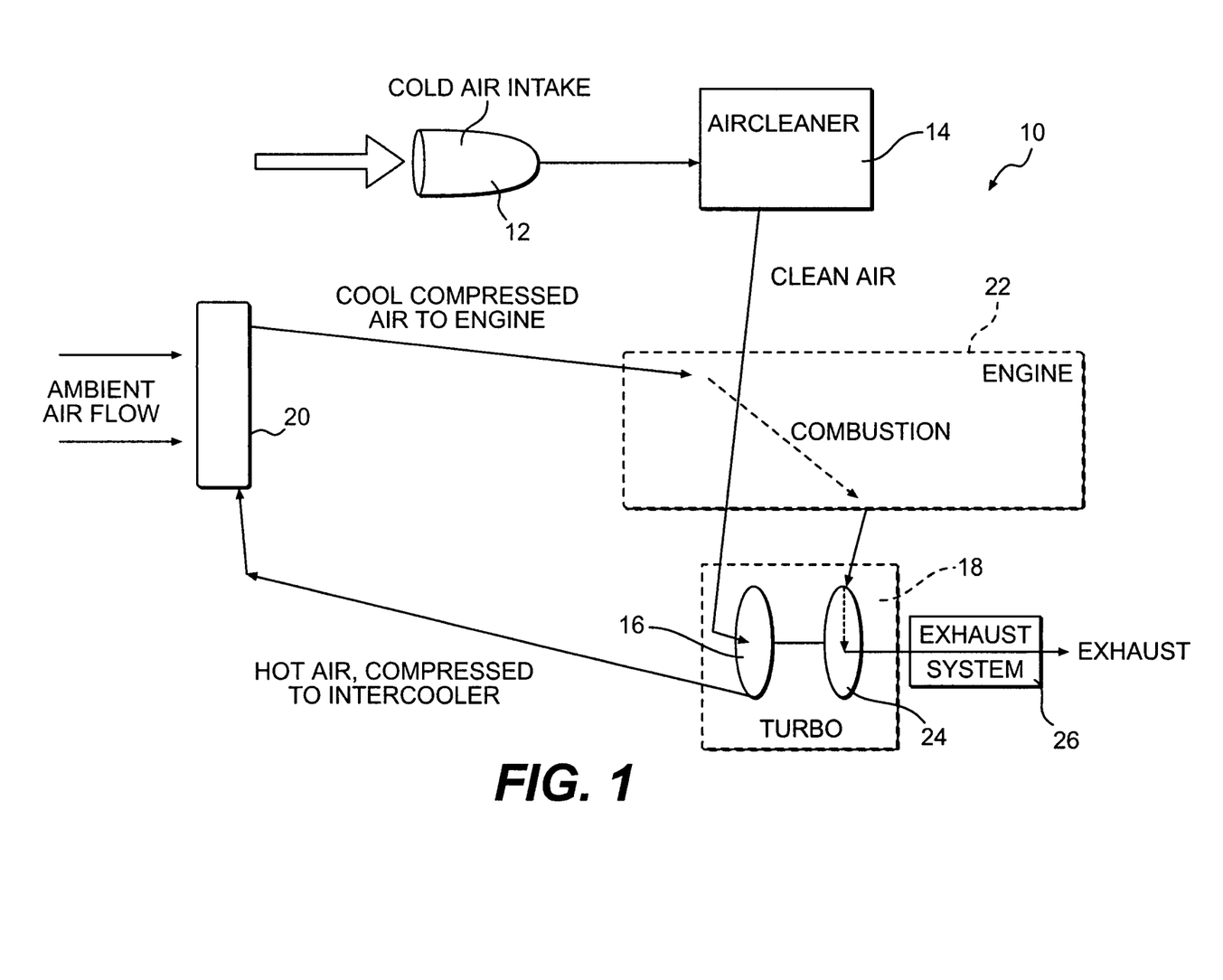
FIG. 1 is a general schematic view of an exemplary boosted engine system embodiment for use with the present invention.

FIG. 1 illustrates a schematic view of a boosted engine system 10. Generally, airflow from an intake 12 is communicated through an air cleaner 14 prior to communication to a compressor 16 of a booster such as a turbocharger 18 or supercharger. It should be understood that other systems may also be utilized to boost charge air. From the turbocharger 18, compressed, heated, airflow ("charge airflow") is communicated through an air-to-air intercooler assembly 20 to reduce the temperature thereof. From the intercooler assembly 20, the cooler airflow is communicated to an engine 22 for combustion therein to provide a motive force. Exhaust from the engine 22 is communicated to a turbine 24 of the turbocharger 18 and exhausted through an exhaust system 26.

It should be understood that although a particular component arrangement is disclosed in the illustrated embodiment, other components arrangements as well as various systems which will benefit from cooled air are also be usable with the present instant invention. The intercooler assembly 20 operates as an air-to-air heat exchanger to cool the charge air as generally understood. The cooled charge air decrease combustion temperature and increases the density of the charge air to increase the air packed into the combustion chambers. It should be further understood that systems which utilize an air-to-air heat exchanger other than motive source systems such as an air conditioning or thermal management system will also benefit from the present invention.

Figure 2:
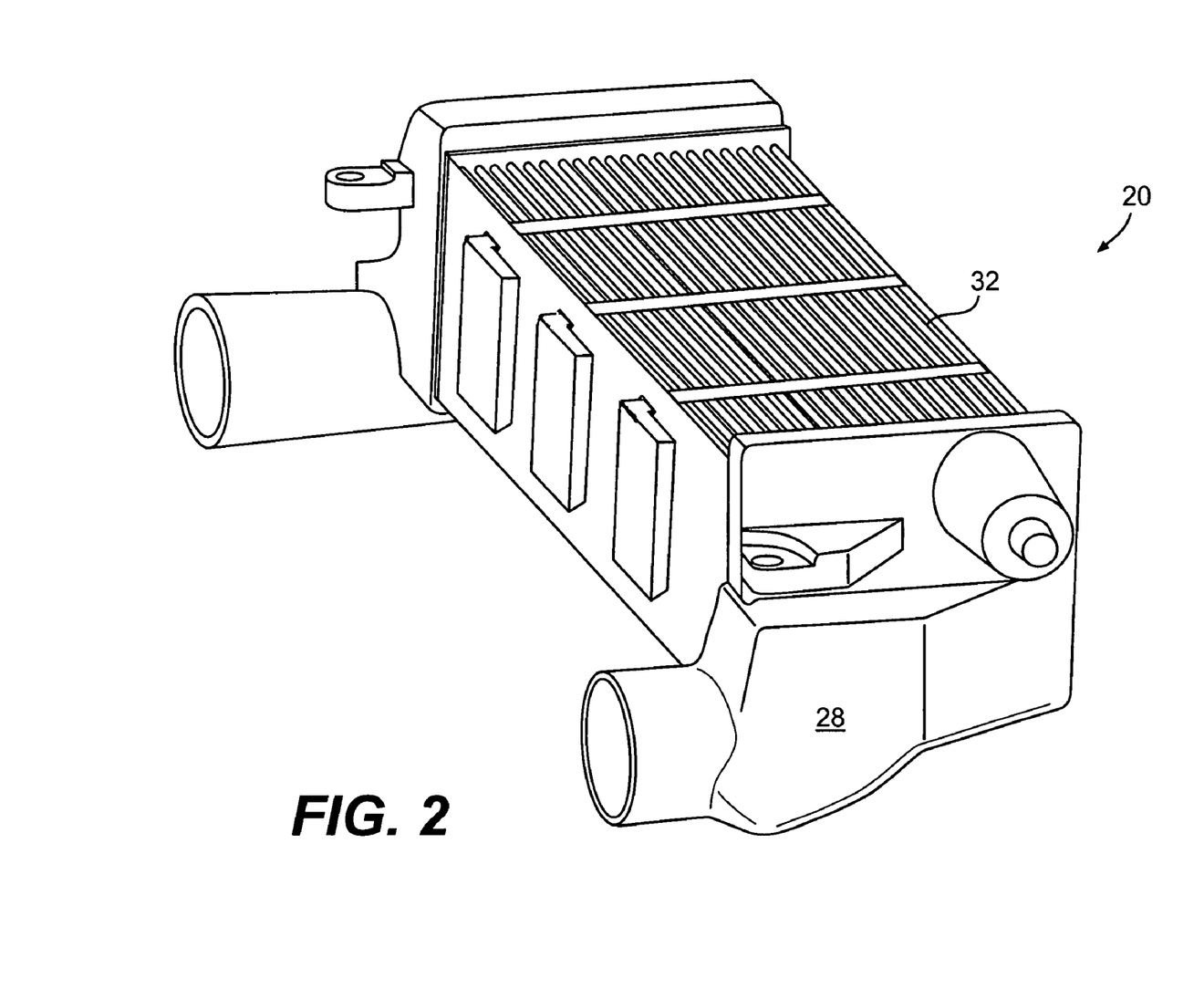
FIG. 2 is a perspective view of an air cooler assembly according to the present invention.

Referring to FIG. 2, the intercooler assembly 20 includes an intake header tank 28, an outlet header tank 30 and a multitude of non-metallic charge tubes 32 which communicate airflow from the intake header tank 28 to the outlet header tank 30. Each of multitude of non-metallic charge 32 in one non-limiting embodiment may define an aspect ratio from 40:1 to 160:1. A multitude of non-metallic fins 34 extend transverse to the longitudinal axis of the multitude of non-metallic charge tubes 32. The multitude of non-metallic charge tubes 32 pass through the fins 34. Notably, relatively few fins 34 are utilized as the fins 34 primarily provide structural support rather than thermal transfer as generally understood with a conventional metal radiator/intercooler system. The fins 34 are mounted to non-metallic side plates 36 which interconnect the intake header tank 28 and the outlet header tank 30 to provide a relatively rigid structure.

Figure 3A:
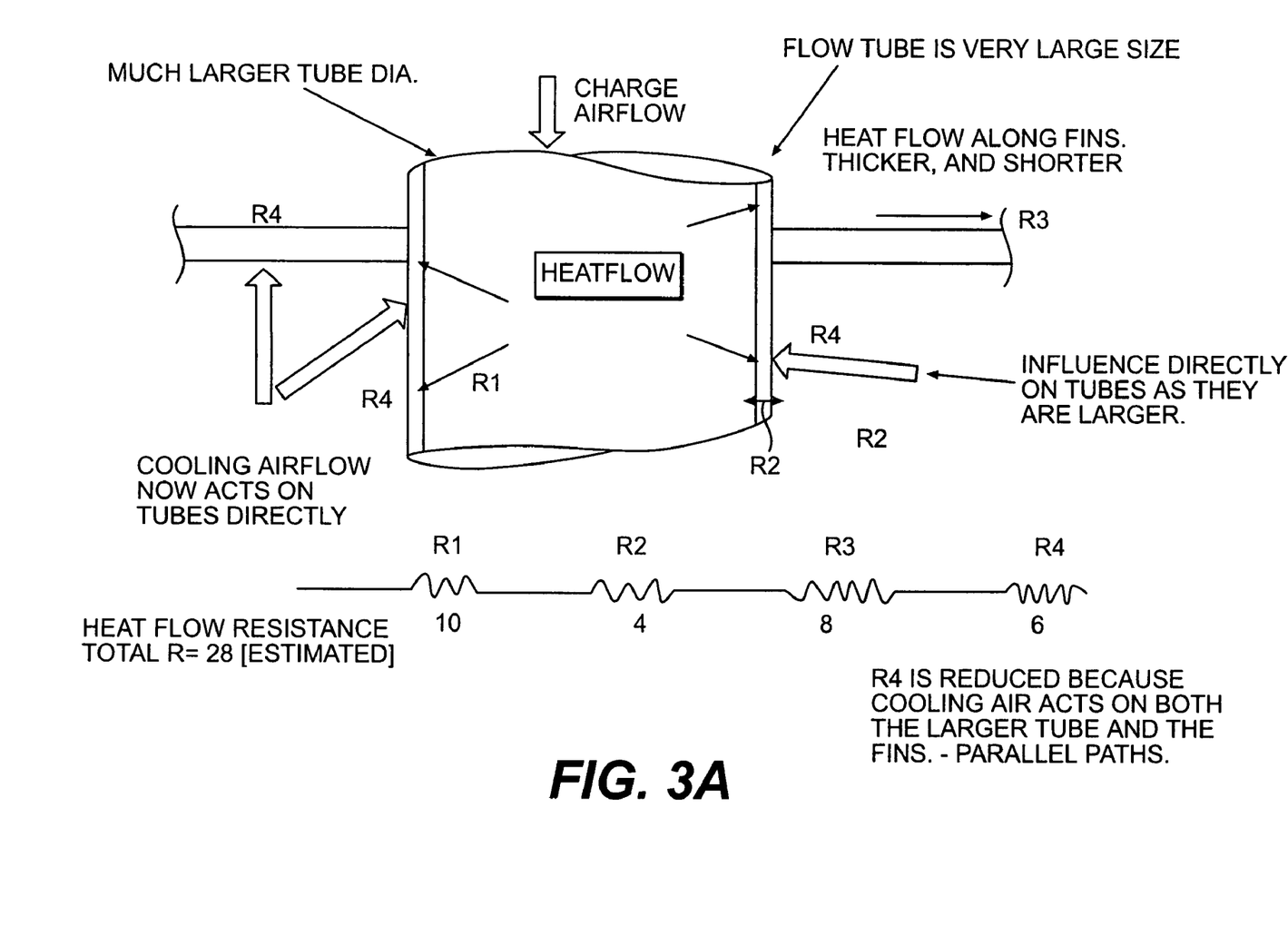
FIG. 3A is a block diagram of the air cooler assembly according to the present invention.
Figure 3B:
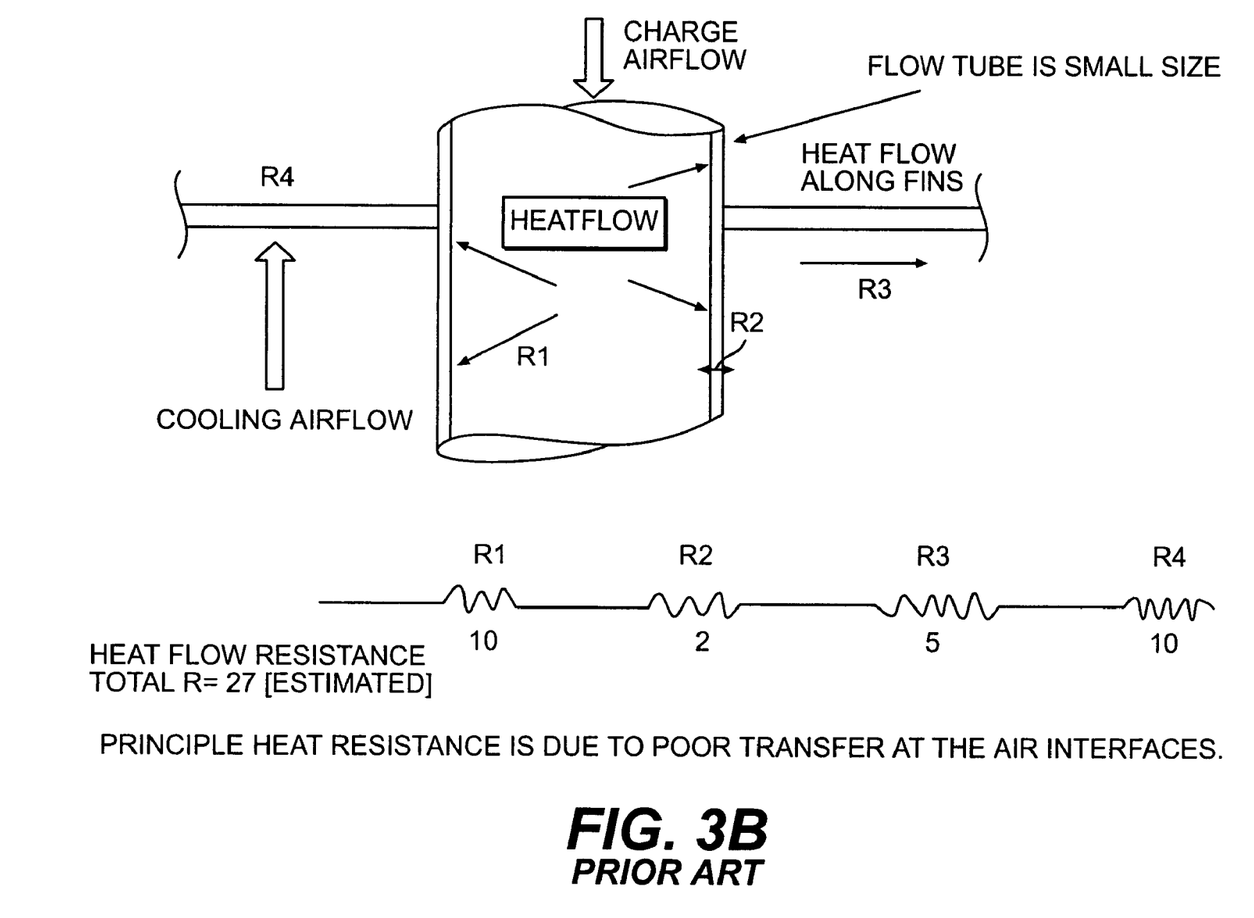
FIG. 3B is a block diagram of a PRIOR ART air cooler assembly utilizing thermal resistance values for comparison to the present invention utilized in FIG. 3A.

Referring to FIGS. 3A, 3B, the non-metallic intercooler assembly 20 designed according to the present invention is a "tube intensive" design. That is, the heat flow resistance on the greater volume provided by the tubes (FIG. 3A) is reduced as compared to the "fin intensive" deign of a conventional metallic intercooler/heat exchanger arrangement (FIG. 3B). The R values in FIGS. 3A and 3B are notional; however, the relative differences representationally distinguish between conventional intercooler designs (FIG. 3B) and the intercooler design according to the present invention (FIG. 3A). It should be understood that the tubes need not only be each individually larger than conventional designs, but will provide a larger volume of airflow due to a larger individual tube size, more numerous tubes, or a combination thereof as schematically illustrated. Most preferably, the multitude of non-metallic charge tubes 32 each provide a length to diameter aspect ratio of between 80:1 and 160:1. Furthermore, as the fins 34 are non-metallic, the fins provide almost no thermal dissipation properties, as non-metallic material are approximately one thousand times less useful than aluminum for thermal transfer properties.

The intake header tank 28, an outlet header tank 30 may be manufactured from non-metallic or metallic materials. The multitude of non-metallic charge tubes 32 and the side plates 36 are preferably manufactured of laser opaque material while the multitude of non-metallic fins 34 are preferably manufactured of laser transparent materials. It should be understood that various combinations and arrangements of laser opaque and laser transparent materials may be utilized to achieve the desired laser welding assembly process disclosed herein. Laser welding is well known and the laser welder will only be schematically described as such laser welders themselves are commonly understood and form no part of the present invention.

Figure 4:
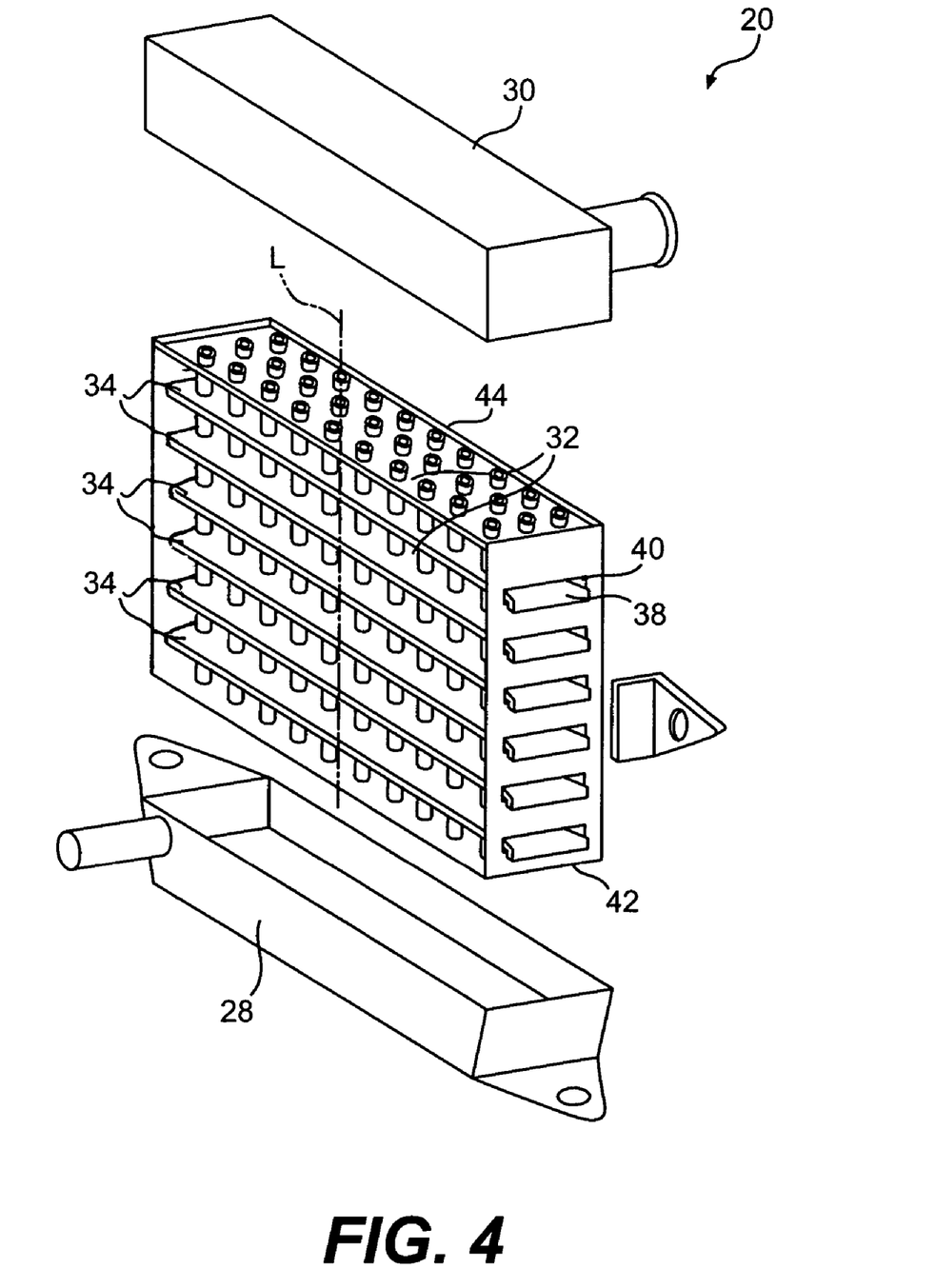
FIG. 4 is an exploded view of an air cooler assembly according to the present invention.
Figure 5:
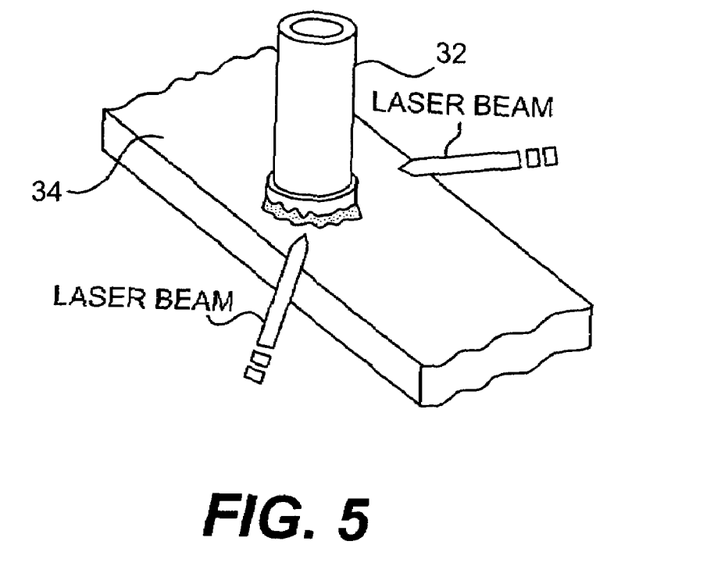
FIG. 5 is an expanded view of a charge tube to fin laser interface according to the present invention.

Preferably, the non-metallic materials utilized in the present invention are thermal plastics. Most preferably, the non-metallic materials utilized herein are nylon 6, nylon 12, nylon 46, nylon 66, PPA, PPS, ABS, polycarbonate, PEEK, polypropylene, and PET. Laser opaque non-metallic materials are manufactured by injecting a carbon black dye into the non-metallic material, while the laser transparent material is manufactured by injecting an organic dye into the non-metallic material. The material may therefore be of generally the same appearance yet provide the necessary difference in laser welding properties. It should be understood that various textures may be utilize to identify the laser opaque from the laser transparent materials as well as provide various aesthetic effects Referring to FIG. 4, the intercooler assembly 20 is illustrated in an exploded view. The multitude of non-metallic fins 34 are located transverse to the longitudinal axis L of the multitude of non-metallic charge tubes 32. The multitude of non-metallic charge tubes 32 pass through the non-metallic fins 34 and are laser welded thereto (FIG. 5; only one tube shown). As the multitude of non-metallic fins 34 are preferably, laser transparent while the multitude of non-metallic charge tubes 32 are laser opaque, the laser is readily directed to the desired location to assure a secure bond.

Figure 6:
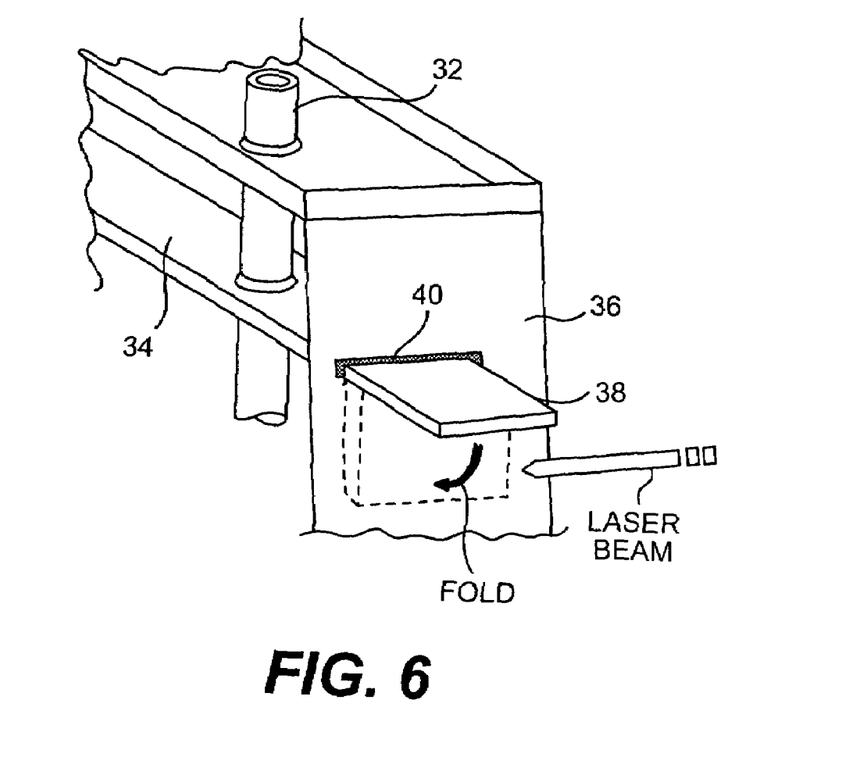
FIG. 6 is an expanded view of a fin to side wall laser interface illustrating the fin planar engagement surface according to the present invention.
Figure 7:
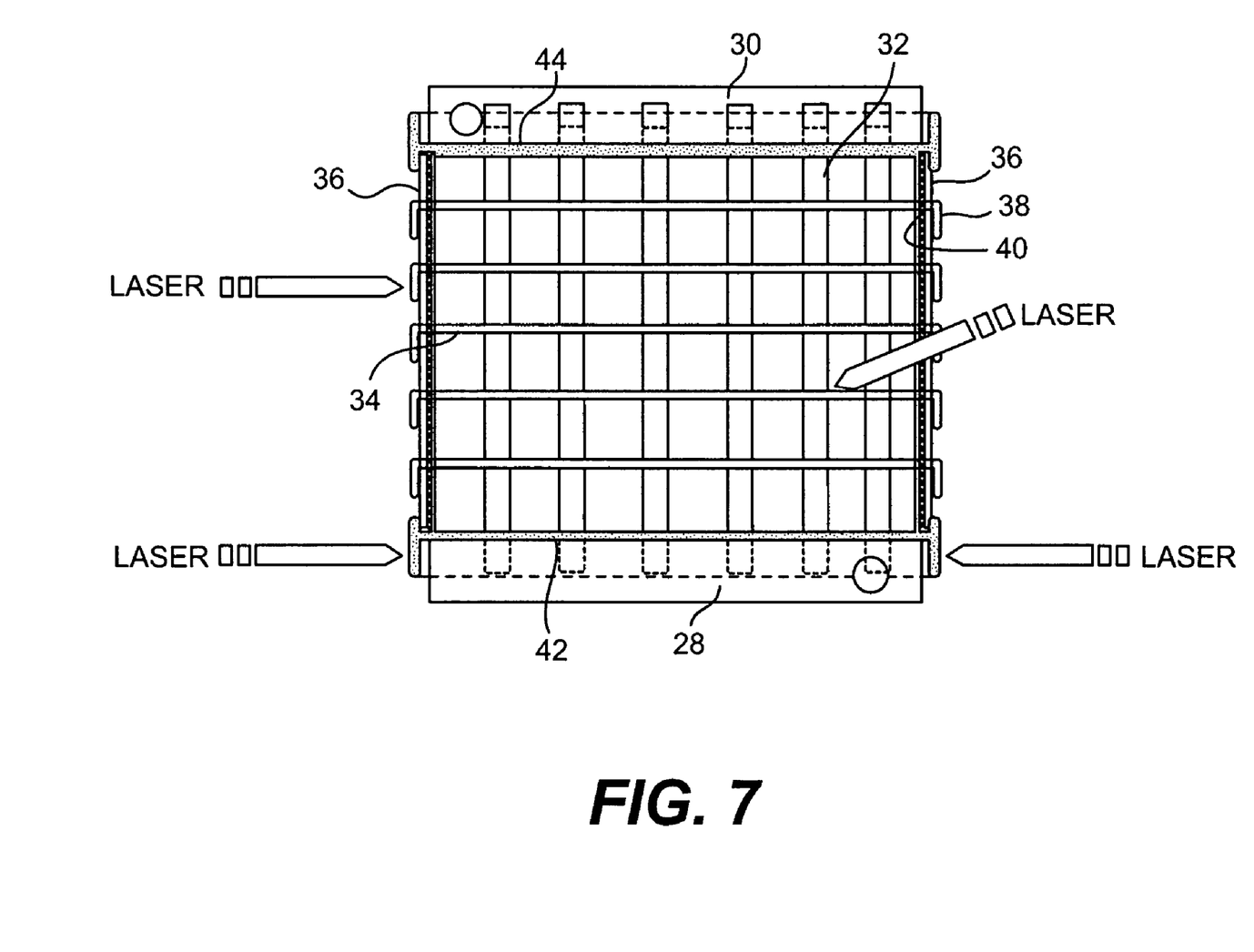
FIG. 7 is a front of an air cooler assembly according to the present invention.

Each of the non-metallic fins 34 include an end section 38 which is assembled through a slot 40 formed in the side plate 36. The end section 38 is then bent toward the side plate 36 to provide a planar engagement surface to receive a laser weld (FIG. 6; FIG. 7). As the multitude of non-metallic fins 34 are preferably, laser transparent while the side plates 36 are laser opaque, the laser is readily directed from an external location to the desired location to assure a secure bond.

Figure 8:
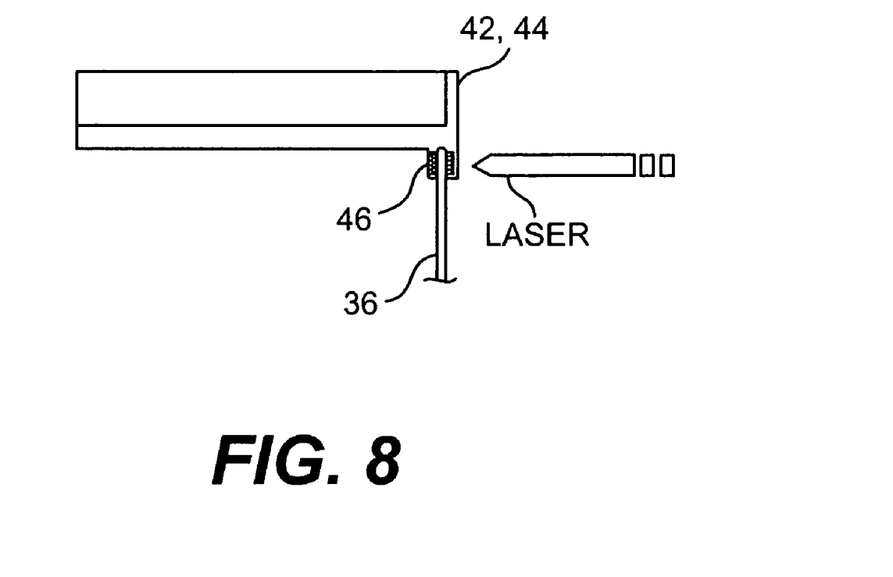
FIG. 8 is an expanded view of a fin to end cap laser interface according to the present invention.

The side plates 36 are laser welded to an end cap 42, 44. Each end cap 42, 44 is essentially of a rectilinear trough shape to direct or collect the airflow to/from the multitude of non-metallic charge tubes 32 and communicate the airflow with the header tanks 28,30. The end caps 42, 44 include a U-shaped receipt portion 46 which receives the side plate 36 therein (FIG. 8). Preferably, the end cap 42, 44 is laser transparent and the side plates 36 are laser opaque. The laser is readily directed from an external location to the desired location to assure a secure bond.

Figure 9:
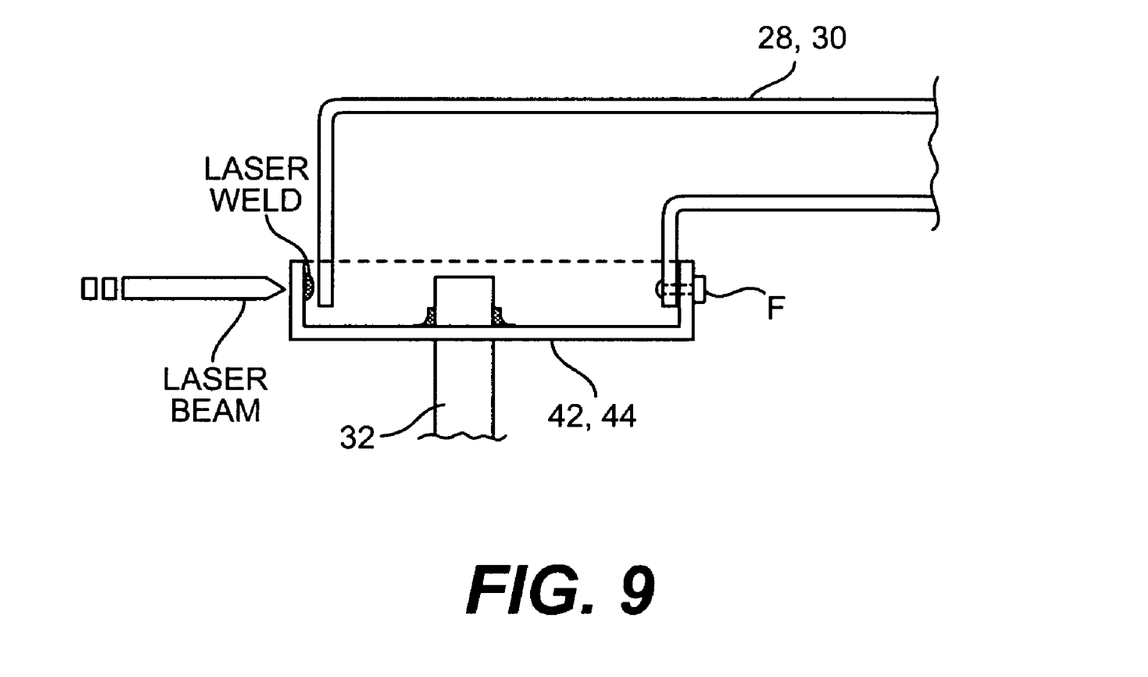
FIG. 9 is an expanded view of an end cap to header tank laser interface according to the present invention.

The shape of the end cap 42, 44 need not be rectilinear but may be of any shape to receive the multitude of non-metallic charge tubes 32 and provide an interface for the respective intake and outlet header tanks 28, 30 (FIG. 7; FIG. 9). That is, the end caps 42, 44 are shaped to receive the respective intake and output header tanks 28, 30.

The intake and output header tanks 28, 30 may be attached to the end caps 42, 44 through fasteners F for intake and output header tanks 28, 30 manufactured of a metallic material (FIG. 9). Alternatively, the header tanks 28, 30 may be manufactured of a non-metallic material and attached to the end caps 42, 44 through laser welding (FIG. 9).

Figure 10:
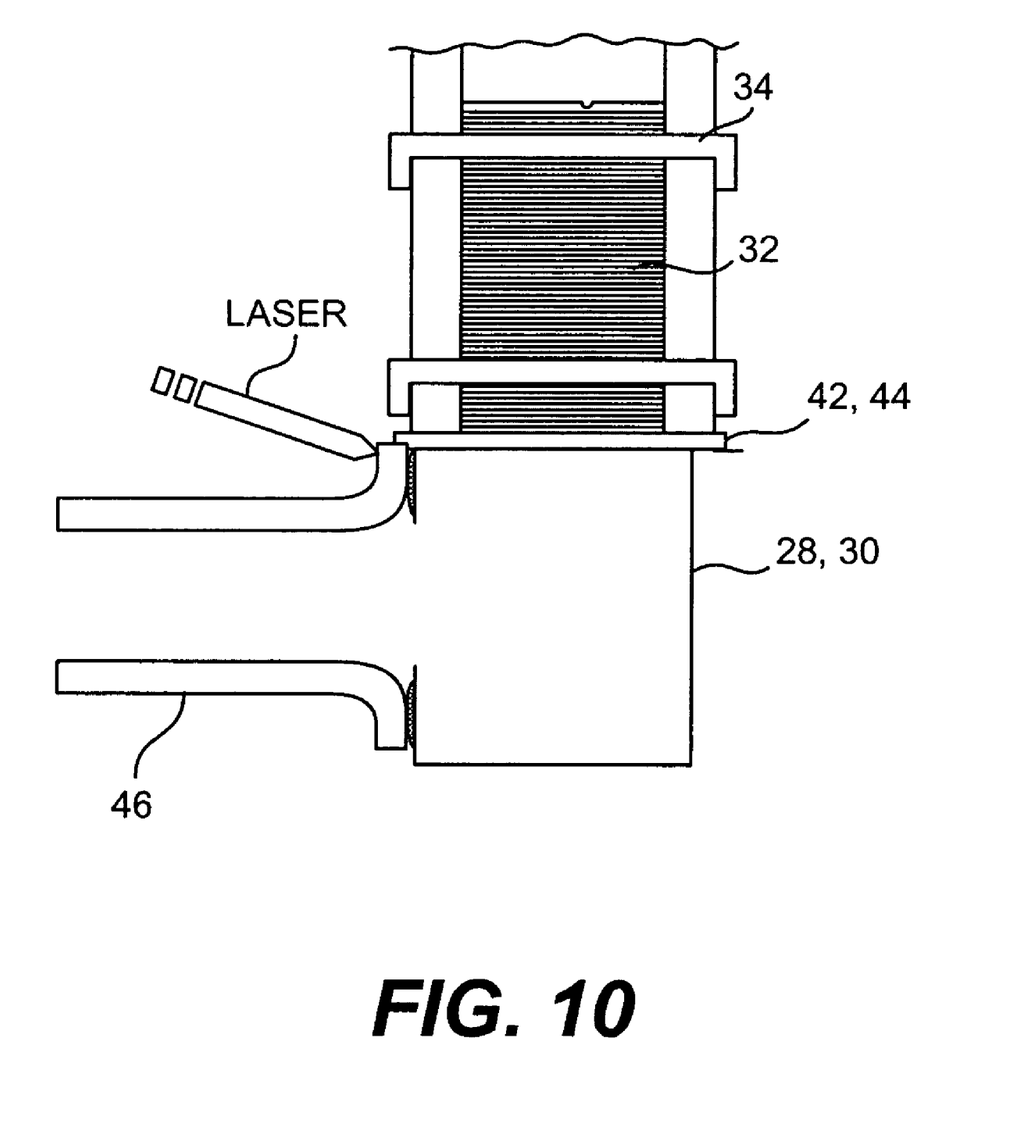
FIG. 10 is an expanded view of a conduit to header tank laser interface according to the present invention.

Referring to FIG. 10, a flexible laser transparent communication conduit 46 is laser welded directly to the laser opaque header tanks 28, 30. Laser opaque header tanks 28, 30 provide laser welding to the laser transparent end caps 42, 44 (FIG. 9). By directly attaching the communication conduit 46 through laser welding, components such as hose clamps and tube barbs are eliminated which thereby increases reliability while minimizing expense, complexity and part count.

Figure 11:
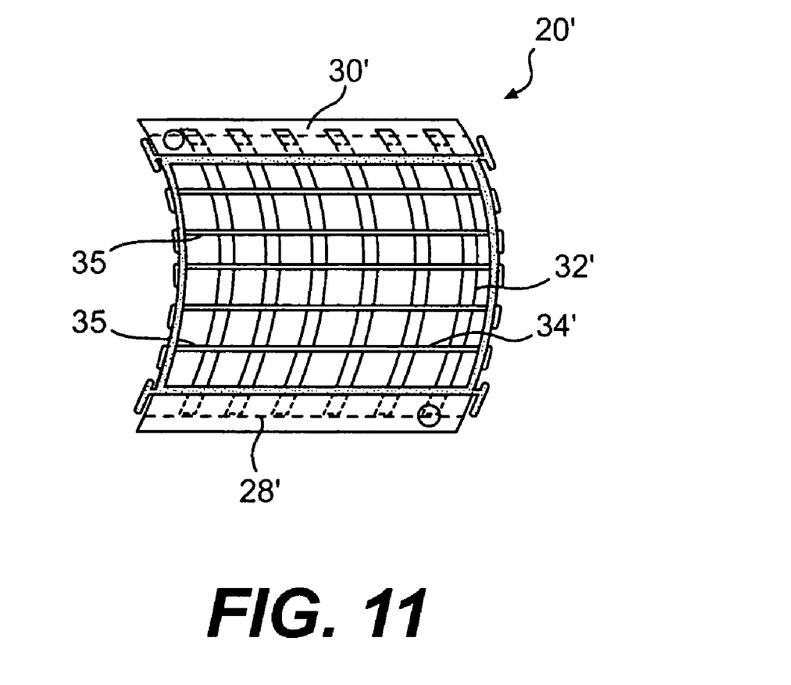
FIG. 11 is a front of another embodiment of an air cooler assembly according to the present invention.
Figure 12:
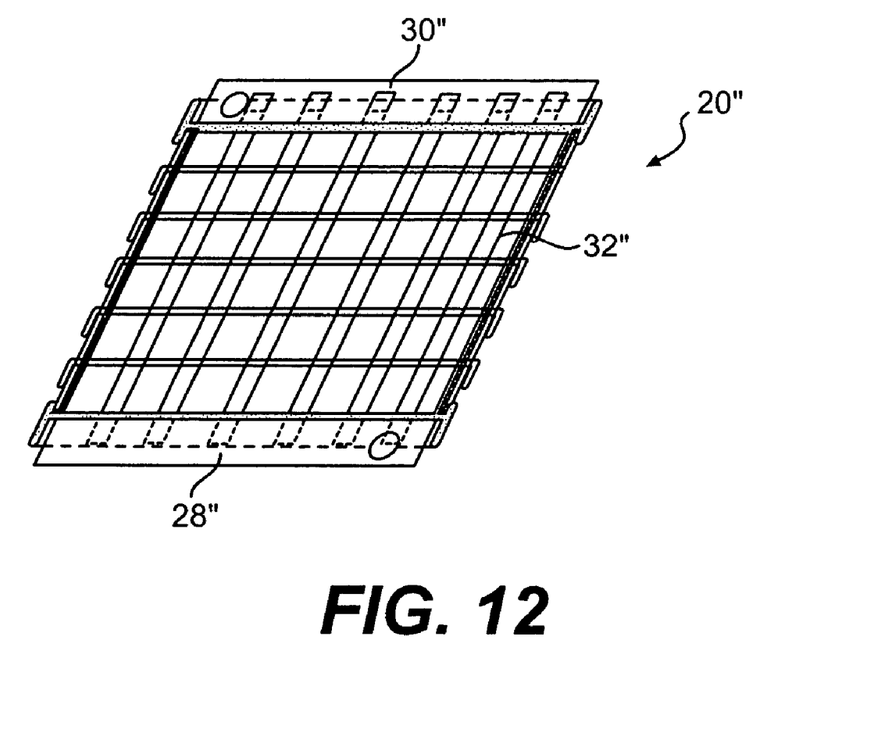
FIG. 12 is a front of another embodiment of an air cooler assembly according to the present invention.

Referring to FIGS. 11 and 12, additional embodiments of an intercooler assembly 20' 20" are illustrated. The intercooler assembly 20', 20" are contoured to provide various shapes by preferably adjusting the shape and/or length of the multitude of non-metallic charge tubes 32', 32". It should be further understood that the header tanks 28', 28", 30', and 30" although illustrated as generally rectilinear, may be shaped to further conform to a desired mounting location.

FIG. 11 illustrates curved non-metallic charge tubes 32' which facilitate installation, for example, adjacent a wheel well. The intercooler assembly 20' includes fins 34' with a corrugated portion 35 such that the length of the fin is longitudinally variable in length during assembly. That is, the corrugated portions 35 permit the length of a single fin 34' to be adjusted to fit various areas and provide some degree of flex to the intercooler assembly 20' within a predetermined plane.

FIG. 12 illustrates a mechanically symmetrical intercooler assembly 20" with header tanks offset for a predetermined installation such as in a raked front facia; chassis mounted; in front of engine cooling radiator; in front of air conditioning condenser; sandwiched between air conditioner and coolant radiator; under a headlight; under a bumper; and/or within a fog light opening. It should be understood that various installations will benefit from the present invention.

Figure 13:
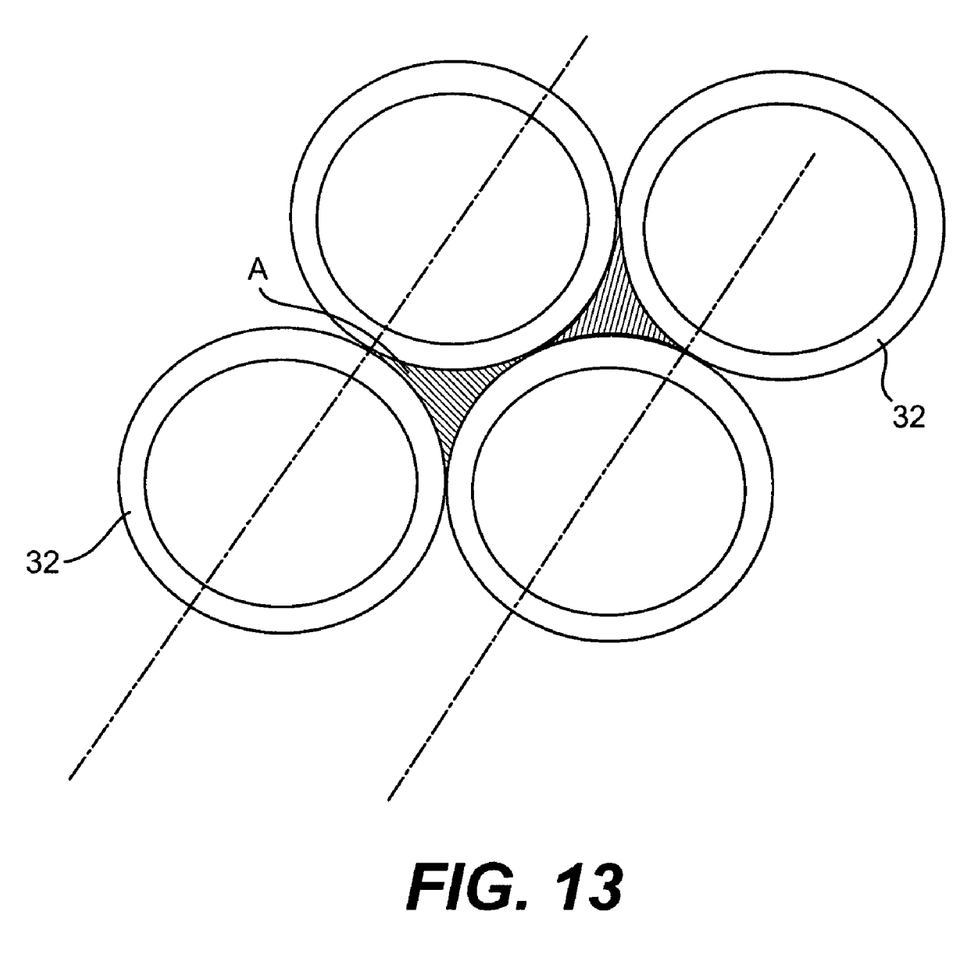
FIG. 13 is a top view of a charge tube packing arrangement as provided to a header tank.
Figure 14:
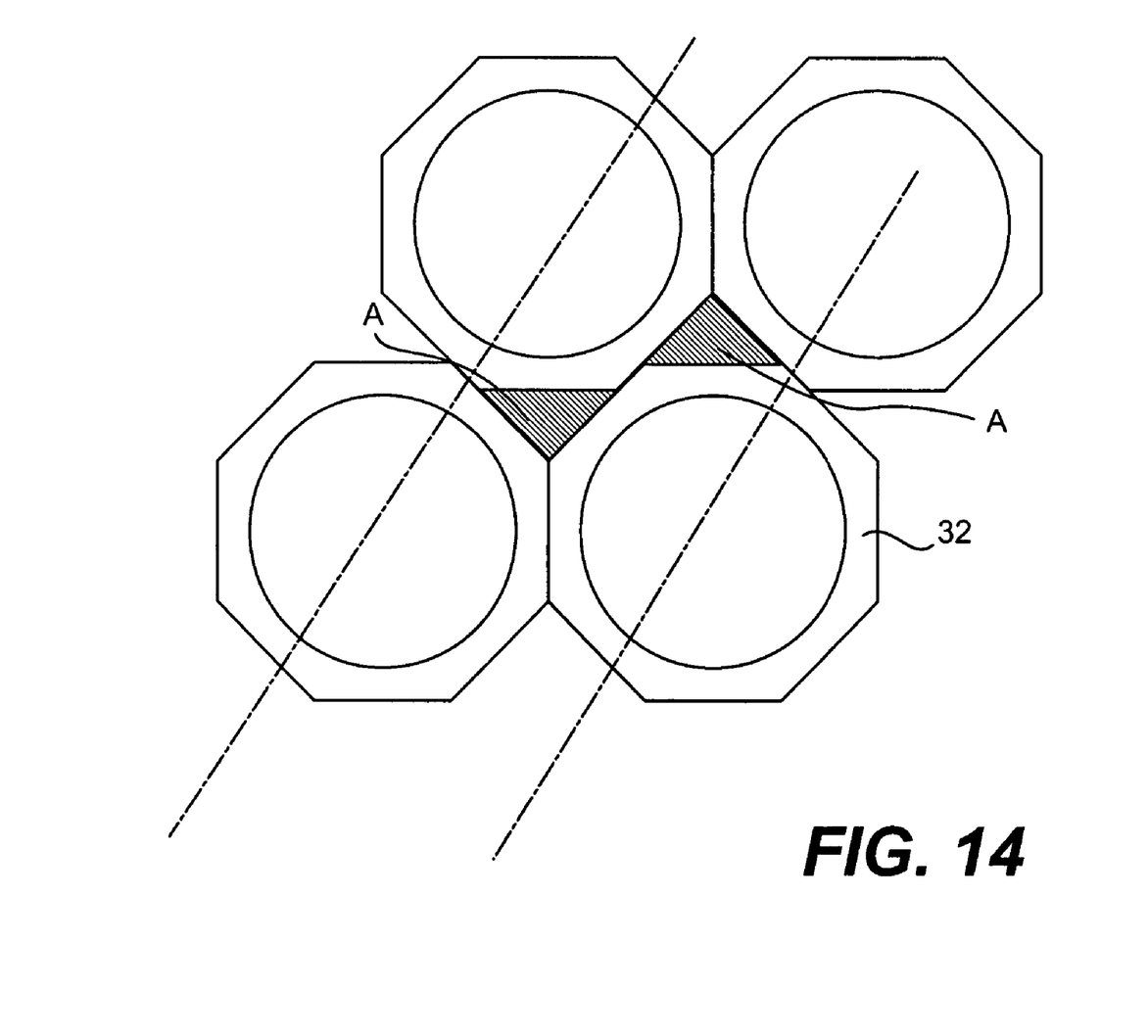
FIG. 14 is a top view of a charge tube packing arrangement as provided to a header tank.
Figure 15:
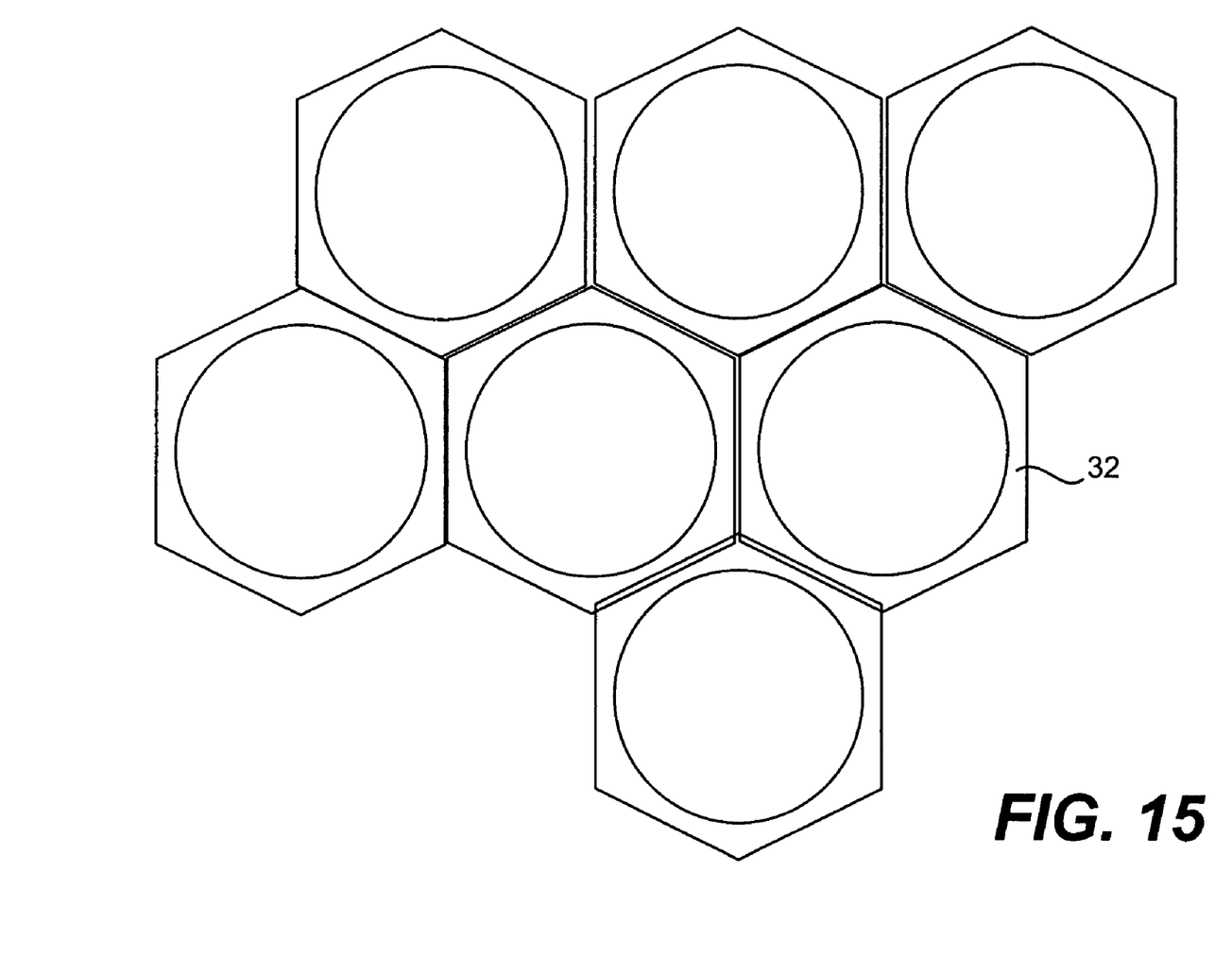
FIG. 15 is a top view of another charge tube packing arrangement as provided to a header tank.

Referring to FIGS. 13-15, the multitude of non-metallic charge tubes 32 may be packed in particular arrangements (FIG. 13) and may alternatively or additionally be non-circular in cross-section. The multitude of non-metallic charge tubes 32 may be polygonal (FIGS. 14 and 15) to increase the density of the tubes and may include various shape combinations so as to specifically tailor the size and shape of the intercooler assembly. Most preferably, the areas A between the non-metallic charge tubes 32 (FIGS. 13 and 14) are filled to prevent airflow dead spaces within the header thanks 28, 30.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An intercooler assembly comprising:
   an intake header tank;
   an outlet header tank; and
   a multitude of non-metallic charge tubes which communicate airflow from said intake header tank to said outlet header tank
   a multitude of non-metallic fins which support said multitude of non-metallic charge tubes, said multitude of non-metallic fins are laser welded to said multitude of non-metallic charge tubes, wherein at least one of said multitude of non-metallic charge tubes or at least one of multitude of non-metallic fins manufactured of a laser transparent material, and the other of said at least one of said multitude of non-metallic fins or said at least one of said multitude of non-metallic charge tubes manufactured of a laser opaque material.

2. The intercooler assembly as recited in claim 1, wherein said multitude of non-metallic fins are laser welded to a side plate.

3. The intercooler assembly as recited in claim 2, wherein said multitude of non-metallic fins extend through said side plate.

4. The intercooler assembly as recited in claim 3, wherein an end section of each of said multitude of non-metallic fins which extend through said side plate, are bent into contact with said side plate to provide a planar engagement surface, said end section laser welded to said side plate at said planar engagement surface.

5. The intercooler assembly as recited in claim 1, wherein each of said multitude of non-metallic fins is manufactured of a laser transparent material.

6. The intercooler assembly as recited in claim 5, wherein a side plate is manufactured of a laser opaque material.

7. The intercooler assembly as recited in claim 6, wherein each of said multitude of non-metallic charge tubes is manufactured of a laser opaque material.

8. The intercooler assembly as recited in claim 1, wherein each of said multitude of non-metallic charge tubes is manufactured of a laser opaque material.

9. The intercooler assembly as recited in claim 1, wherein each of said multitude of non-metallic charge tubes define an aspect ratio from 40:1 to 160:1.

10. The intercooler assembly as recited in claim 1, wherein each of said multitude of non-metallic charge tubes are circular in a cross-section taken transverse to a longitudinal axis.

11. The intercooler assembly as recited in claim 1, wherein said intake header tank and said outlet header tank are manufactured of a metallic material.

12. The intercooler assembly as recited in claim 1, wherein said multitude of non-metallic fins and said multitude of non-metallic charge tubes are arranged such that a laser is directed through said laser transparent material toward said laser opaque material to form at least one laser weld.

* * * * *